(12) United States Patent
Hrdy et al.

(10) Patent No.: US 9,747,075 B2
(45) Date of Patent: Aug. 29, 2017

(54) RANDOM NUMBER GENERATOR

(71) Applicant: EM Microelectronic Marin S.A., Marin (CH)

(72) Inventors: Tomas Hrdy, Rudna u Prahy (CZ); Michal Prazan, Praha (CZ); Pavel Holoubek, Tlustovousy (CZ)

(73) Assignee: EM Microelectronic-Marin S.A., Marin (CH)

( * ) Notice: Subject to any disclaimer, the term of this patent is extended or adjusted under 35 U.S.C. 154(b) by 268 days.

(21) Appl. No.: 14/250,549

(22) Filed: Apr. 11, 2014

(65) Prior Publication Data

US 2014/0324934 A1 Oct. 30, 2014

(30) Foreign Application Priority Data

Apr. 26, 2013 (EP) ..................................... 13165630

(51) Int. Cl.
  *G06F 7/58* (2006.01)

(52) U.S. Cl.
  CPC .............. *G06F 7/584* (2013.01); *G06F 7/588* (2013.01)

(58) Field of Classification Search
  None
  See application file for complete search history.

(56) References Cited

U.S. PATENT DOCUMENTS

| 6,240,432 | B1 | 5/2001 | Chuang et al. |
| 8,209,367 | B2 * | 6/2012 | Radja ...................... G06F 7/588 |
| | | | 708/251 |
| 2002/0186086 | A1 * | 12/2002 | Curiger .................... H03K 3/84 |
| | | | 331/78 |
| 2010/0005129 | A1 * | 1/2010 | Miller ....................... G06F 7/58 |
| | | | 708/251 |
| 2012/0089656 | A1 * | 4/2012 | Tanamoto ................ H03K 3/84 |
| | | | 708/252 |
| 2012/0213358 | A1 | 8/2012 | Dror et al. |
| 2012/0233232 | A1 | 9/2012 | Vergnes et al. |
| 2014/0324934 | A1 * | 10/2014 | Hrdy ....................... G06F 7/584 |
| | | | 708/252 |

FOREIGN PATENT DOCUMENTS

WO   WO 2009/109959 A1   9/2009

OTHER PUBLICATIONS

European Search Report issued Oct. 25, 2013 in EP application 13165630, filed on Apr. 26, 2013 ( with Written Opinion).
Extended European Search Report issued Jul. 15, 2014 in Patent Application No. 14162850.3.

(Continued)

*Primary Examiner* — David H Malzahn
(74) *Attorney, Agent, or Firm* — Oblon, McClelland, Maier & Neustadt, L.L.P.

(57) ABSTRACT

The random number generator comprises a linear feedback shift register (10), which comprises a series of storage elements (14(1), 14(2), . . . , 14(n)), a first input (11) to receive a clock signal from a clock oscillator (28), a feedback line (20) connecting the output of a last storage element (14(n)) with an input of at least a first storage element (14(1)), a second input (22) coupled with the feedback line (20) via at least one cell (15) and wherein the output of the cell (15) is coupled to an input of at least one of the storage elements (14(1), 14(2), . . . , 14(n)).

20 Claims, 2 Drawing Sheets

(56) References Cited

OTHER PUBLICATIONS

R. Mita, et al., "A novel pseudo random bit generator for cryptography applications", Electronics, Circuits and Systems, IEEE, vol. 2, XP010614393, Sep. 15, 2002, pp. 489-492.

Joan Melia-Segui, et al., "Multiple-polynomial LFSR based pseudorandom number generator for EPC gen2 RFID tags", IECON 2011—37th Annual Conference on IEEE Industrial Electronics Society, XP032085385, Nov. 7, 2011, 6 Pages.

* cited by examiner

RANDOM NUMBER GENERATOR

This application claims priority from European patent application No. 13165630.8 filed Apr. 26, 2013, the entire disclosure of which is hereby incorporated herein by reference.

FIELD OF THE INVENTION

The present invention relates to the field of random number generators and in particular to random number generators based on linear feedback shift registers.

BACKGROUND AND PRIOR ART

Random number generators are widely used in the field of electronics and in electronic devices. Especially when the electronic device is subject to startup the random number generator should provide unpredictable numbers within a fairly short response time. Simple random number generators typically implement pseudorandom number generator circuits or true random number generator circuits based on noise. The choice of the random number generating circuit is however important to fulfill security requirements of various electronic applications.

The random number generator circuit has to be configured to consume as low power as possible and to be testable in reasonable time. Conventional random number generators that feature a large and hence sufficient degree of randomness make use of a memory function, wherein a seed number is stored in a memory during shutdown of the random number generator or of the respective electronic device. Upon startup, the stored number is read and hence recovered from the memory. While such a random seed storage provides sufficient randomness the write and read operation comes along with non-negligible power consumption. Moreover, the read and write procedures are quite time intensive and therefore introduce a certain time delay.

SUMMARY OF THE INVENTION

It is therefore an object of the present invention to provide an improved random number generator, which provides excellent randomness while consuming a minimum of electrical power. Moreover, the random number generator should exhibit a fast response, typically in the range of only a few milliseconds and the random number generator should exhibit an easy testing.

In a first aspect the invention relates to a random number generator based on a linear feedback shift register (LFSR). The LFSR comprises a series of storage elements and a first input to receive a clock signal from a clock oscillator. The LFSR further comprises a feedback line connecting the output of a last storage element with an input of at least a first storage element.

Even though such a LFSR circuit produces a stream of values that is completely determined by its current or previous state, with an appropriately chosen feedback function such LFSR can produce a sequence of bits which appears random and which has a fairly long cycle. The various storage elements of the LFSR are typically arranged in series and represent a bit value. Depending on the implemented feedback some bit position may affect the next state of the LFSR. Such bits in the LFSR which influence the input are denoted as tabs. Generally, the sequence of numbers generated by an LFSR can be considered a binary numeral system.

The arrangement of tabs for feedback in an LFSR can be expressed in finite field arithmetic as a polynomial mod 2. This means that the coefficients of the polynomial must be 1's or 0's. Typically, such a polynomial is called the feedback polynomial or reciprocal characteristic polynomial. Typically, the set of tabs should be relatively prime. In this case, the respective polynomial is irreducible, thereby maximizing the length of the cycle of the respective LFSR.

In order to further enhance randomness of the random number generator a second input is provided which is coupled with the feedback line via at least one combinatorial cell. The output of this cell is further coupled to an input of at least one of the storage elements. By means of the second input, a second input signal can be provided to the LFSR which has a direct influence on the sequence of numbers generated by the clocked LFSR. By means of the second input, the LFSR-inherent feedback can be modified thereby increasing or improving randomness of the random number generator.

The second input can be driven almost arbitrarily. The second input may be connected and coupled to a large variety of sources. In this way, the second input provides a universal interface to modify the random sequence provided by the LFSR.

In this way, a pseudo- or true random number generator can be provided without the necessity of storing and reading of a random seed upon shutdown and startup. In this way, power consumption of the random number generator can be reduced without affecting or even by improving randomness of the random number generator.

According to another embodiment the cell of the LFSR has a first cell input connected to the feedback line and further has a second cell input connected to the second input. In this way, the cell has two inputs, one connected to the second input line for receiving the second input signal. The other input of the cell is however connected to the feedback line. By means of the cell the second input and the feedback line can be combined and processed in order to modify at least one of the LFSR's storage elements.

By means of the cell the configuration of at least one storage element of the LFSR can be modified in response to the feedback signal as well as in response of the second input signal. If no second input signal is provided via the second input, the LFSR may operate as a conventional LFSR given that the cell is adapted to modify the feedback only when a second input signal is present. Depending on the implementation of the cell the feedback modification implemented by that cell may vary in various different ways.

According to another embodiment the output of the cell is connected to an input of the first storage element. In this way the whole sequence of consecutively arranged storage elements may be affected by the output of the cell and hence in response to the second input signal entering the cell via the second input.

In alternative implementations the output of the cell may be connected to a variety of storage elements or to a single but arbitrarily chosen storage element. Moreover, the output of the cell may be configurably connectable to different storage elements, thereby further increasing randomness.

According to another embodiment the cell comprises an XOR-cell. The XOR-cell provides a very simple, fast and reliable approach to modify the signal of the feedback line and to couple the feedback line with the second input.

In still another embodiment the second input is connected to a random source. The random source may be implemented almost arbitrarily. The random source coupled and connected to the second input may be a noise source. It may also comprise another oscillator. Moreover, it may be implemented as some kind of sensor by way of which environmental conditions such as varying temperature or varying ambient light may have an influence on the randomness of the random number generator.

According to another embodiment the second input is actually connected to a second oscillator which is decoupled from the clock oscillator. The second oscillator operates rather independent from the clock oscillator and may therefore serve as a random source for the random number generator.

In still another embodiment the oscillation frequency of the second oscillator, which is coupled and connected to the second input is larger than the oscillation frequency of the clock oscillator. By choosing a rather large frequency for the second oscillator a fast switching of the second input in comparison to the clock signal can be provided, thereby further improving randomness and response time of the LFSR and hence of the random number generator.

Moreover, and according to another embodiment the frequency and/or a jitter of the clock oscillator and/or the second oscillator is sweepable or modifiable. In particular, jitter and/or frequency of such oscillator may vary with process, temperature and supply voltage level. By varying the frequency and/or the jitter of this oscillator, randomness and response time of the LFSR and hence of the entire random number generator may further be increased. When the frequency of the oscillator becomes subject to a modification, it may smoothly sweep between two specific and predefined frequencies. Additionally, these specific frequencies may also vary with process, temperature and supply voltage level. In this way, the randomness of the random number generator may be further increased.

According to another aspect, the second input is not only coupled with one cell but is coupled with at least two or even more cells that are each assigned to different storage elements of the LFSR. In this way, the second input does not only serve to modify the state of a first storage element but may arbitrarily modify the states of various storage elements either in the same or in different ways. In this way not only the sequence of states of the first storage element may be modified but also the configuration and implementation of the feedback polynomial of the LFSR may become subject to at least transient or permanent modifications.

By means of at least a transient modification of the feedback in polynomial implemented by the LFSR, the irreducibility of the polynomial may be abandoned or resigned for a short period of time. But since the modification is of transient nature the overall randomness of the random number generator may be further increased.

In this way and according to another embodiment the second input is coupled to the series of storage elements to at least temporally modify the linear feedback shift register's feedback polynomial. Coupling of the second input to at least two or to the complete series of storage elements of the LFSR may be electronically controlled and may be arbitrarily modified during operation of the random number generator.

In this way, the values or coefficients of the feedback polynomial may be temporally modified in order to further enhance the randomness of the random number generator. With this implementation, the general rule of LFSR-implementation to provide an irreducible polynomial may be at least temporally violated. Since the modification of the polynomial is of transient nature the randomness of the LFSR and the randomness of the random number generator will be generally enhanced.

When coupling the second input to a series of storage elements in order to modify the feedback polynomial, the first storage element does not necessarily have to be connected or coupled to the second input. In this case, the feedback line of the LFSR may be connected with the input of the first storage element in a rather unmodified configuration.

According to another embodiment, the cell comprises an AND-cell whose output is connected to an input of an XOR-cell. Said XOR-cell couples an output of one storage element to an input of a consecutive storage element. Alternatively, said AND-cell could also be replaced by some other kind of logic cell, such like an XOR-cell. By means of an AND-cell implementation a coupling between the second input and the feedback line can be provided in a very simple, cost efficient and fast responding way.

In still another embodiment, the output of the linear feedback shift register is coupled to a further shift register that is also driven by the clock oscillator. By means of this separate and further shift register the series of random numbers generated by the random number generator can be consecutively stored and can be provided to a signal processing unit of an electronic device. In this way, a parallel data output can be provided to the signal processing unit. Depending on varying implementations of the random number generator the shift register may be replaced by other appropriate output devices.

According to another embodiment the storage elements comprise D flip-flops. Such data or delay flip-flops capture the value of an input at a definite portion of the clock cycle, typically at the rising edge of the clock. The captured value then becomes the output. At other times, the output does not change and the D flip-flop can be considered as a basic memory cell. Implementation of the various storage elements as D flip-flops is rather simple, cost efficient and area saving.

In still another but independent aspect the invention also relates to an electronic device comprising at least one random number generator as described above. The electronic device may comprise a handheld electronic device, hence a mobile and battery-driven electronic device, such like a mobile phone, a portable computer or a watch.

BRIEF DESCRIPTION OF THE DRAWINGS

In the following, various embodiments of the invention will be described in detail by making reference to the drawings, in which.

DETAILED DESCRIPTION

Figure 1:
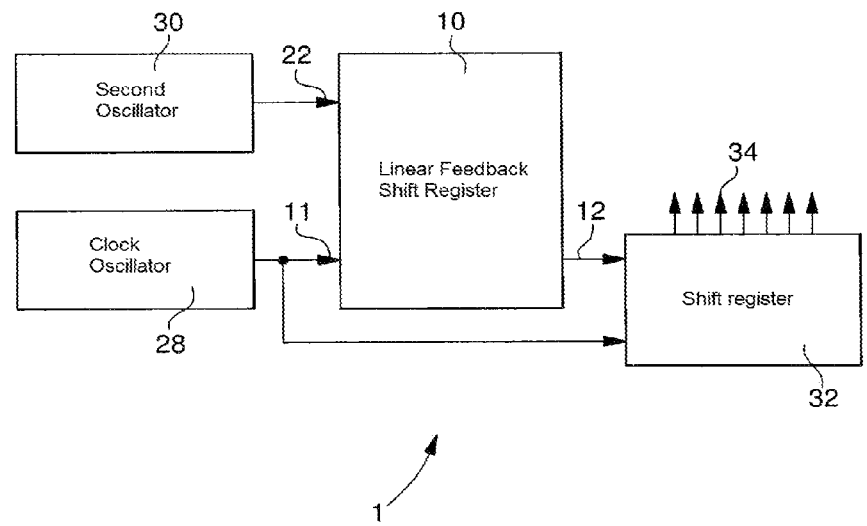
FIG. 1 schematically illustrates the random number generator in a block diagram, FIG. 2 schematically depicts the structure of the LFSR according to a first implementation.

The random number generator 1 as shown in FIG. 1 comprises a linear feedback shift register (LFSR) 10 that is driven by a clock oscillator 28. Consequently, the LFSR 10 comprises a clock input 11 that is connected to an output of the clock oscillator 28. The clock oscillator 28 is further coupled with a shift register 32 which is connected to an output 12 of the LFSR. The shift register 32 provides parallel data output 34 and represents a sequence of random numbers.

The LFSR 10 further comprises an internal feedback 20 in order to provide a sequence of random numbers.

Additionally, the LFSR 10 comprises a second input 22 that is coupled with a further random source 30. In the present implementation the random source 30 is implemented as a second oscillator 30 by way of which the LFSR-inherent feedback 20 can be modified in order to increase randomness of the sequence of random numbers provided at the LFSR's output 12.

Figure 2:
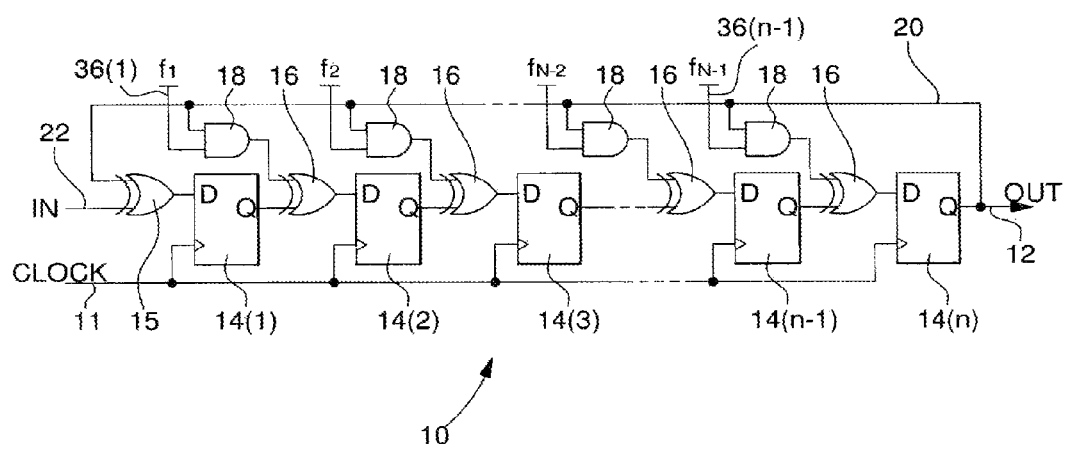

In the implementation according to FIG. 2, the LFSR 10 comprises a series of storage elements 14(1), 14(2), . . . 14(n). The various storage elements are implemented as D flip-flops and each comprise an input D and an output Q. As shown in FIG. 2, the output Q of the first storage element 14(1) is coupled with the input D of a consecutive storage element 14(2) via an XOR-cell 16. The XOR-cell 16 comprises two inputs, one being connected with the output Q of the first or previous storage element 14(1) and the other one being connected with an output of an AND-cell 18.

The two inputs of the AND-cell 18 are connected with the feedback line 20 and with a polynomial input 36. The polynomial input 36 represents the feedback polynomial of the LFSR. Depending on the value of the respective polynomial input 36(1), 36(2), . . . 36(n−1) various feedback polynomials may be implemented.

Additionally and in order to modify the feedback of the LFSR, the feedback line 20, which connects the output Q of the last storage element 14(n) with the input D of the first storage element 14(1) is connected with a cell 15 that is further coupled with the second input 22. In the implementation according to FIG. 2, this additional cell 15 is implemented as an XOR-cell. Its output is connected with the input D of the first storage element 14(1) whereas one of its inputs is connected and coupled with the second input 22 and wherein the other input is connected and coupled with the feedback line 20.

In this way, the second input 22 is coupled with the feedback line 20 and has a direct influence of the LFSR-inherent feedback of the random number generator 1. In this way, storing of an actual random seed upon shutdown and reading of a respective random seed during startup is no longer necessary. By means of the second input 22 an arbitrary random source may be coupled to the LFSR 10 thereby implementing and increasing randomness, especially during startup. In this way, a rather fast responding random number generator 1 can be provided featuring a response or startup time in the range of only a few milliseconds, e.g. around 2 ms, less than 2 ms, e.g. around 1.5 ms or even below 1 ms.

The second input may be arbitrarily coupled to various random sources 30. In the present implementation the second random source 30 comprises a second oscillator 30. Here it is of particular benefit, when the oscillation frequency of the second oscillator 30 is larger than the oscillation frequency of the clock oscillator 28. Moreover, it is of further benefit, when the clock oscillator 28 and the second oscillator 30 are completely decoupled. In other implementations the second oscillator 30 may be replaced by a noise generator or by any kind of sensor adapted to generate a required noise level.

Figure 3:
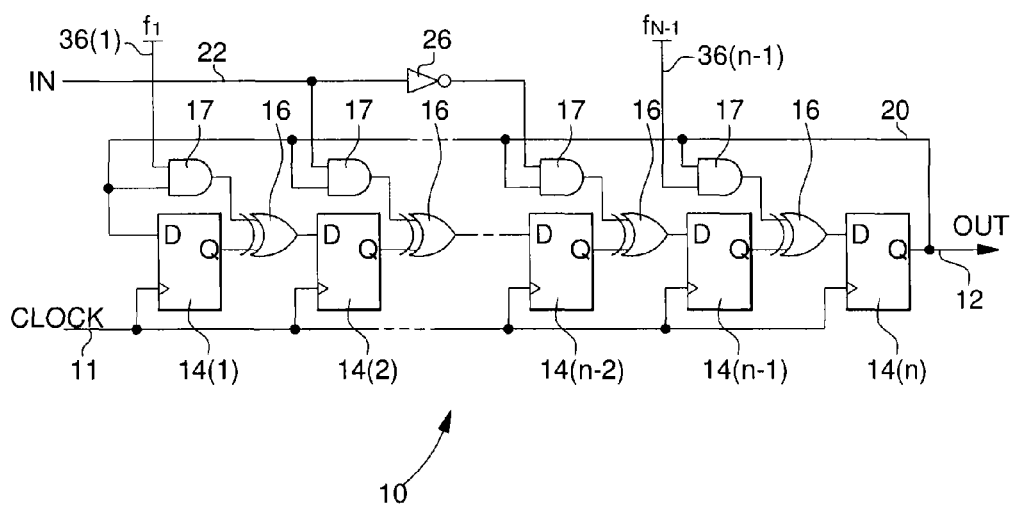
FIG. 3 shows a second implementation of the LFSR.

In the implementation according to FIG. 3 the first storage element 14(1) is directly connected to the feedback line 20. But here and in contrast to the implementation according to FIG. 2 the second input 22 is connected and coupled to at least two storage elements, namely to storage element 14(3) and to storage element 14(n−1). Also here, consecutive storage element 14(1), 14(2), . . . 14(n) are coupled via XOR-cells 16 whose input is connected to the output of a respective AND-cell 17. Additionally, one input of all AND-cells 17 is connected and coupled with the feedback line 20. But in contrast to the implementation according to FIG. 2 the other input of the AND-cells 17 is either connected and coupled with the second input 22 or with the polynomial input 36.

In this way, the second input 22 serves to modify the feedback polynomial of the LFSR 10. Especially when the second input 22 is subject to rapid modifications, as may be typically the case when connected to a fast oscillating second oscillator 30, the feedback polynomial can be temporally modified and changed thereby increasing the randomness of the LFSR 10 and of the respective random number generator 1. This modification of the feedback polynomial may even come along with a violation of the general rule that the feedback polynomial should be irreducible. However, due to the transient nature of the modifications implemented by the second input 22 the increase and improvement of the randomness may easily compensate for a respectively shortened periodicity of the sequence of the numbers generated by the LFSR.

As further indicated in FIG. 3, the second input 22 may further be provided or coupled with a combinatorial element 26. In this way, the second input signal provided via the second input 22 may be differently transmitted to the various cells 17 depending on varying external conditions.

Generally, the various polynomial inputs 36(1), 36(2), . . . , 36(n−1) may be modified by the second oscillator 30, by way of which the transient behavior of the polynomial inputs 36(1), . . . 36(n-1) can be arbitrarily modified. In this way, the values f1, f2, f(n−1) of the feedback polynomial can be at least temporally modified in order to further increase randomness.

It is further to be noted, that the two embodiments as illustrated and described in FIGS. 1-3 only represent two basic approaches on how to implement the idea and the basic concept of the present invention. The invention as specified in the appending claims is by no way to be limited to the illustrated embodiments but may be implemented in a variety of different ways as expressed in the claims and their mutual combinations. Furthermore, it is to be noted that any reference numerals used in the claims shall not be construed to limit the scope of the present invention.

What is claimed is:

1. A random number generator comprising:
    a first clock oscillator,
    a second oscillator, and
    a linear feedback shift register, said linear feedback shift register comprising:
        a series of storage elements including a first storage element and a last storage element,
        a series of XOR-cells including a first XOR-cell corresponding to the first storage element, each of the storage elements corresponding to one of the XOR-cells,
        a series of AND-cells, each of the storage elements except the first storage element corresponding to one of the AND-cells,
        a first input into one of the storage elements from the first clock oscillator, the first input defined as a clock signal,
        a feedback line connecting an output of the last storage element with an input into the first XOR-cell and the AND-cells, and
        a second input into the first XOR-cell corresponding to the one of the storage elements from the second oscillator, wherein the first clock oscillator and the second oscillator are decoupled such that the oscillators do not receive an input from a same source.

2. The random number generator according to claim 1, wherein the output of the first XOR-cell is connected to the input of the first storage element.

3. The random number generator according to claim 1, wherein the second input is connected to a random source.

4. The random number generator according to claim 1, wherein an oscillation frequency of the second oscillator is larger than the oscillation frequency of the first clock oscillator.

5. The random number oscillator according to claim 1, wherein the frequency and/or a jitter of the first clock oscillator and/or the second oscillator is sweepable.

6. The random number generator according to claim 1, wherein the second input is coupled with at least one cell assigned to different storage elements.

7. The random number generator according to claim 6, wherein the second input is differently coupled to the at least one cell.

8. The random number generator according to claim 1, wherein the second input is coupled to the series of storage elements to at least temporally modify the linear feedback shift register's feedback polynomial.

9. The random number generator according to claim 1, wherein the cell comprises an enable element of feedback line whose output is connected to an input of an XOR-cell coupling an output of one storage element to an input of a consecutive storage element.

10. The random number generator according to claim 1, wherein an output of the linear feedback shift register is coupled to a shift register.

11. The random number generator according to claim 1, wherein the storage elements comprise any memory element.

12. An electronic device comprising at least one random number generator according to claim 1.

13. A random number generator comprising:
a first clock oscillator,
a second oscillator, and
a linear feedback shift register, said linear feedback shift register comprising:
  a series of storage elements including a first storage element and a last storage element,
  a series of XOR-cells including a first XOR-cell corresponding to the first storage element, each of the storage elements in connection with one of the XOR-cells,
  a series of AND-cells, each of the storage elements except the first storage element in connection with one of the AND-cells,
  a first input into the first storage element from the first clock oscillator, the first input defined as a clock signal,
  a feedback line connecting an output of a last storage element with a first cell input into the first-XOR cell, and
  a second cell input into the first XOR-cell from the second oscillator,
wherein the first clock oscillator and the second oscillator are decoupled such that the oscillators do not receive an input from a same source.

14. The random number generator according to claim 13, wherein the output of the first XOR-cell is connected to the input of the first storage element.

15. The random number generator according to claim 13, wherein the second input is connected to a random source.

16. The random number generator according to claim 13, wherein an oscillation frequency of the second oscillator is larger than the oscillation frequency of the first clock oscillator.

17. The random number oscillator according to claim 13, wherein the frequency and/or a jitter of the first clock oscillator and/or the second oscillator is sweepable.

18. The random number generator according to claim 13, wherein the second input is coupled with at least one cell assigned to different storage elements.

19. The random number generator according to claim 18, wherein the second input is differently coupled to the at least one cell.

20. The random number generator according to claim 13, wherein the second input is coupled to the series of storage elements to at least temporally modify the linear feedback shift register's feedback polynomial.

* * * * *